United States Patent [19]

Odekirk

[11] Patent Number: 4,470,908

[45] Date of Patent: Sep. 11, 1984

[54] SOLIDS TRAP

[76] Inventor: William H. Odekirk, 7446 Gatewood Rd., SW., Seattle, Wash. 98136

[21] Appl. No.: 486,093

[22] Filed: Apr. 18, 1983

[51] Int. Cl.³ .................. B01D 23/06; B01D 25/04
[52] U.S. Cl. .................................. 210/463; 29/509
[58] Field of Search .............. 210/163, 400, 461, 463, 210/477, 484, 447, 448; 52/11, 12, 95, 96; 29/509

[56] References Cited

U.S. PATENT DOCUMENTS 97,160   11/1869   Burliegh .................... 210/477
2,887,073   5/1959   Thompson .................... 55/12

Primary Examiner—Richard V. Fisher
Assistant Examiner—Sharon T. Cohen
Attorney, Agent, or Firm—David L. Garrison

[57] ABSTRACT

The invention comprises a trap for use in a fluid conduit in which foreign solid material may occasionally be carried by the fluid. The trap has a duct-like body, preferably of similar cross-sectional area to the conduit in which it will be installed. A foraminous strainer is located transversely across the body to remove solid material. A cleanout port is located in the duct wall immediately upstream from the foraminous strainer. This can be opened to allow access to the strainer so that any retained solid material can be easily removed. The cleanout port has a self-hinged door with edges bent to provide a light clamping action against the body to retain the door in a normally closed position. The clamping force can be readily adjusted so that the door is opened by the head of liquid retained in the conduit if the strainer becomes plugged by retained solids.

15 Claims, 6 Drawing Figures

U.S. Patent   Sep. 11, 1984   Sheet 1 of 2   4,470,908
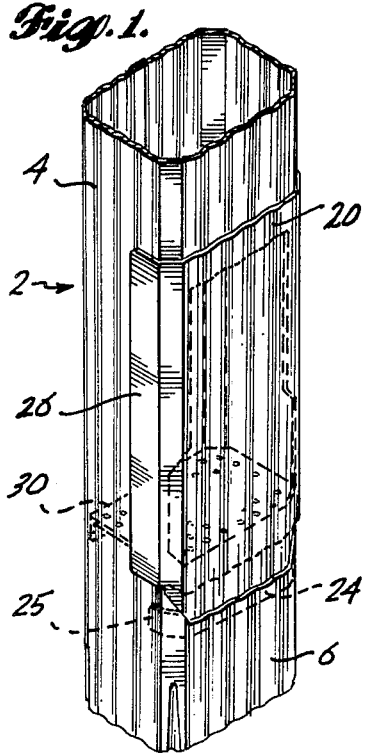
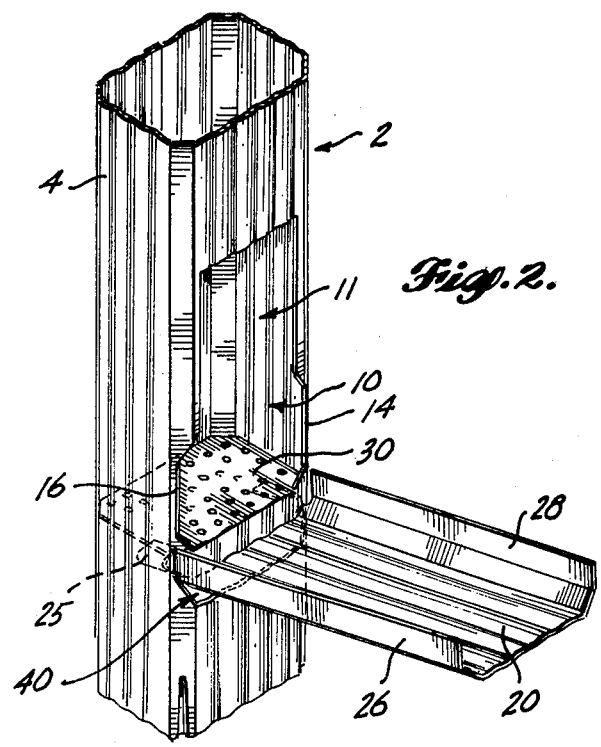
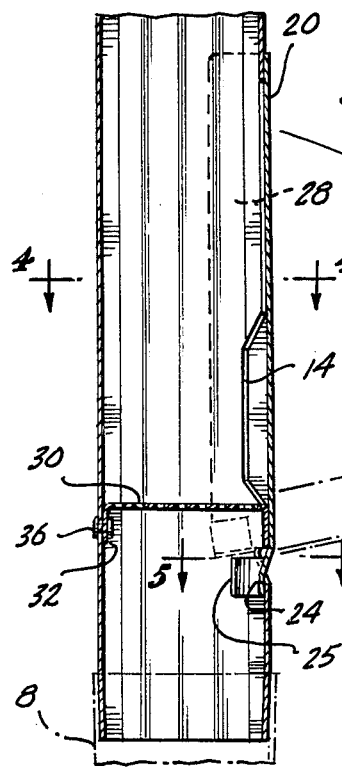
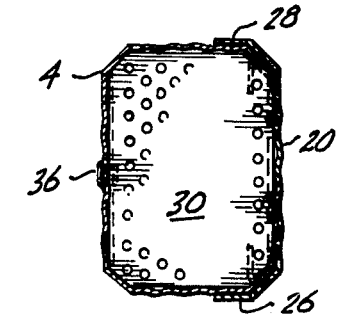
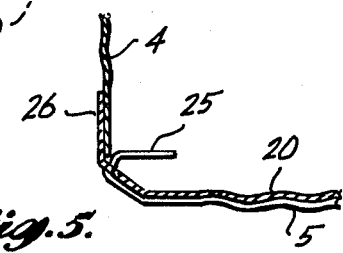

SOLIDS TRAP

BACKGROUND OF THE INVENTION

The present invention comprises a trap and clean-out port for removing unwanted solid materials from a fluid stream being carried in a conduit, and a method of making the trap. The invention is particularly well adapted for removing debris such as leaves or other fallen residue from trees which is carried by rain water through building downspouts.

Tree debris can cause a vexing problem for building owners. It tends to adhere to roofs and accumulate in gutters where it interferes with proper drainage of rain water. Some of this material will be carried out of the gutters and into the downspouts by water runoff. In situations where this water is simply wasted onto the surface of the ground or into a storm sewer system this trash may not pose a serious problem. However, many residences waste rain water from downspouts into dry wells. These are holes dug into the ground and filled with course gravel. Solid material carried into the dry wells tends to plug the exposed soil surface in the dry well so that the water is not rapidly carried away in the soil. When dry wells become plugged, localized flooding can often occur during heavy rain storms. This can cause many obvious adverse effects. In severe cases it can result in undermining foundation footings. When a dry well becomes plugged, the property owner often has little alternative other than to dig a new dry well, a laborious and often expensive project.

A number of simple devices are available which are designated to prevent entry of debris into downspouts. Almost universally, these consist of a screen or cage which projects into the rain gutter from the upper end of the downspout. While these are effective for a short period of time, they soon become loaded with debris so that water cannot enter the downspout at the needed rate. When this occurs the gutter fills to the brim and overflows. Since rain gutters are usually difficult of access, cleaning these screens can be a bothersome and/or hazardous process. It must usually be done by one high up on a ladder which cannot always be solidly or safely placed because of obstructions.

This invention is an answer to the problem of removing debris from downspouts or other fluid conduit in a manner that is both safe and convenient.

SUHMARY OF THE INVENTION

The present invention comprises an improved solids or debris trap for a fluid conduit and a method of making such a trap. While the trap is particularly well adapted for installation in rain gutter downspouts, those skilled in the art will recognize that its use would not be so limited. The device can find application in many situations where it is desirable to remove debris from gaseous or liquid streams being transported in a pipe or conduit.

The device comprises a duct-like body means which is adapted for insertion at some predetermined location within the fluid carrying conduit. In its simplest form it comprises a foraminous strainer means which is located transversely across the body means in order to intercept and retain any solid materials being carried in the fluid stream. A cleanout port is located adjacent to the foraminous strainer. The device should be positioned within the conduit so that when in operation the cleanout port is upstream from the strainer. The cleanout port comprises a first aperture in the well of the body means and a hinged door which can be easily opened to provide access for cleaning debris from the strainer.

In the preferred form of the device the door is set into a second aperture in the body means which is located downstream from but closely adjacent to the strainer means. The door has a major or upper portion, which lies outside the trap and covers the first or cleanout aperture, and a minor or lower portion located inside the body means and covering the second aperture. A hinge line is formed when the door passes into the duct through the second aperture. Using this construction, liquid flowing down through the trap is prevented from splashing or leaking from either aperture. The lower portion of the door acts to direct liquid descending across the door back into the duct.

The device can be most conveniently made by taking a short piece of the duct into which the trap will be inserted for use as the body means. The lower end may be crimped somewhat so that is will slip readily into another section of the duct. The two apertures are then formed, usually by cutting them into the wall of the body means. The door, made separately, is then inserted into the lower aperature.

In the most preferred mode of manufacture, the upper aperture is cut out only along three sides, leaving a lower edge still attached to the body means to form a tab. This tab must be at least long enough to go transversely across the body means. The tab is perforated with a multiplicity of small holes to form the foraminous strainer means. It is then bent inward at approximately a 90 degree angle so that it lies transversely across the duct and forms an integral strainer means, attached by its front edge at the cleanout aperture by a fold line. A smaller tab may be formed on the free end of this strainer means which then, after bending, can be attached to the rear wall of the body means by a pop rivet or other fastening device.

In one preferred form of the invention, the cleanout door is frictionally clamped to hold it in place on the body means. This clamping bias can be adjusted so as to retain the door in a normally closed position. However, the bias can be adjusted so that if the strainer becomes plugged so as to cause the buildup of a column of liquid behind or above it, the hydrostatic head of retained liquid will force the door open to allow its egress. The open door will then provide a visual signal that the strainer should be cleaned and restored to its normal operational condition.

It is an object of the present invention to provide a solids trap for a conduit which is effective in operation, simple and inexpensive to construct, and which can be easily and rapidly cleaned.

It is another object to provide a debris trap for a conduit which will allow alternative egress of the transported fluid if the device should become so heavily plugged as to prevent further passage of the fluid.

These and many other objects will become readily apparent upon reading the following detailed description taken in conjunction with the attached drawings.

BRIEF DESCRIPTION OF THE DRAWINGS

FIG. 1 is a perspective view of the solids trap as it would normally appear in use.

FIG. 2 is a similar perspective view with the cleanout port opened so that any trapped debris could be removed.

FIG. 3 is a cross-section of the trap taken in side elevation.

FIG. 4 is a cross-sectional view taken along line 4—4 of FIG. 3.

FIG. 5 is a cross-sectional view taken along line 5—5 of FIG. 3.

DETAILED DESCRIPTION OF THE PREFERRED EMBODIMENT

Figure 6:
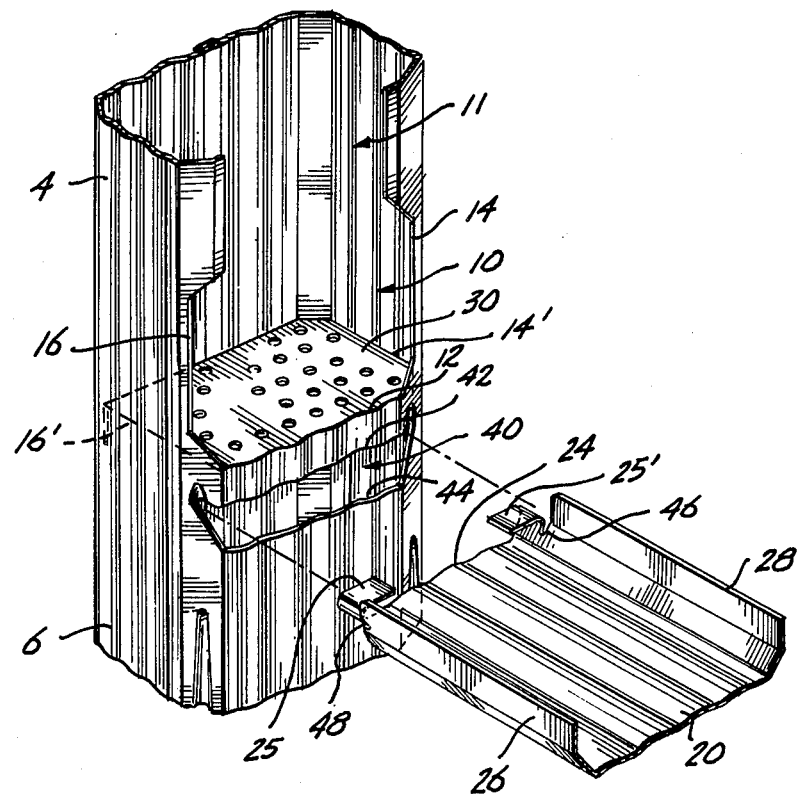
FIG. 6 is a perspective view of the solids trap in disassembled form.

The present description of the debris trap is directed to its use in a rain downspout. As explained before, this is for the sake of convenience of exemplification, and is not intended to be a limitation. A solids trap, indicated at 2, comprises a generally rectangular body means 4. This has a slightly tapered end 6, so that it can readily be slipped, if desired, into another adjoining section of conduit 8. The body member 4 has a cleanout opening comprising a lower portion 10 and upper portion 11 cut into the front face. Below this opening is a second opening 40 which is generally in the from of an isosceles trapezoid. The longer of the parallel base lines of this trapezoid is preferably located at the upper or upstream edge of the device, although this is not critical. Immediately above the lower opening is a foraminous strainer means 30. While this may be formed from a separate member, it is most conveniently made as an integral part of the body means. This is done as follows. The lower part 10 of the cleanout opening or aperture is preferably cut along edges 14,16 to a width and length so that, when bent along fold line 12, it will snugly fit within the body portion of the trap. This portion of the wall may be perforated with a multiplicity of small holes either before or after the cleanout opening is cut. When bent into the duct along fold line 12, this tab portion then forms strainer element 30. A smaller tab 32, formed from material removed from opening 11, may be formed on the free end of this strainer element before it is folded. This may then be secured to the back wall of the body means by a pop rivet 36, or other fastening means so that the strainer is solidly mounted and secure from deflection during cleanout operations. The edges 14',16' of the strainer represent portions originally cut from the front wall of the body means along lines 14,16.

The cleanout port further has a door which covers it during normal operation. This is preferably formed from a separate piece of conduit of similar form to the one used for making the trap body. This comprises an upper or major portion 20, which covers the cleanout opening 10,11 and the strainer element 30, and a lower portion 24 which is inserted into the lower aperture 40. The lower portion 24 covers the lower aperture when the door is in closed position and, further, acts to direct water which might be descending across the inside surface of the door into the trap body. Narrow notches 46,48 are cut into the longitudinal edges of the door at the position where it enters the lower or second aperture, along the longer base line 42 of the trapezoidal opening. Retainer tabs 24 and 25 may be rolled inward to allow insertion of the door into the second aperture 40 and then folded outward so that the door is securely retained. Cut line 42 of the second aperture then becomes the self-hinge point of the door. The sloping sides of this trapezoidal aperture serve further to retain the door in position. It will be evident that it is the inwardly sloping side portions that are functional and not the trapezoidal shape per se. The term "substantially trapezoidal" is meant to be read broadly and is intended to encompass other functionally equivalent shapes such as an inverted triangle or semicircle.

In the preferred version the door will also have edges 26,28 which partially wrap around body member 4. These can be bent so that they provide a predetermined clamping bias acting to hold the door to the body means and prevent its accidental opening. This clamping bias can be readily adjusted to control the amount of force required to open the door. A latch could also be provided to hold the door in a closed position, if desired.

The gripping force of edge 26 and 28 can be readily adjusted so that if the strainer 30 should become plugged to the point that a column of water builds up above it, the hydrostatic head will force door 20 to open. This prevents a major backup of water in the system. With door 20 open, the water will harmlessly waste out onto the adjacent ground surface. This also presents a ready indication of the plugged condition so that the screen can be cleaned.

In addition to the preferred construction detailed earlier, the foraminous strainer 30 may be any screen, perforated plate, or similar device which will permit passage of the fluid yet retain the debris. The openings can be sized to control the maximum particle width that will be allowed to pass through the strainer.

The solids trap may be installed at any convenient point within a conduit, and may be used in either a vertical or horizontal position; although vertical is preferred. The conduit may be of any conventional shape, such as round, square, or the preferred generally rectangular form shown in the illustrations. In the most preferred form of the invention the solids trap is sized so as to be of essentially the same cross-sectional dimensions as the conduit in which it is inserted. The body member may be either a relatively short piece, or the trap can be formed in place in one portion of a much longer section of conduit.

Many equivalent structures to those described will be apparent to those skilled in the art. It is the inventor's intention that the scope of the invention be limited only as defined in the following claims.

What is claimed is:

1. A solids trap for a gutter downspout which comprises:
    (a) a duct-like body means adapted for insertion at a predetermined location in the downspout;
    (b) a cleanout port in the wall of the body means, said port comprising a first aperture in the wall and having upstream and downstream ends;
    (c) a foraminous strainer means having front and rear edges located transversely across the body means at the downstream end of the cleanout port;
    (d) a hinged door covering the cleanout port, said door having longitudinal edges which wrap around the body means and provide a predetermined clamping bias acting against the body means so as to retain the door in a normally closed position; and
    (e) a second aperture in the body means located downstream from and adjacent to the strainer means and serving to retain and form a hinge area for the door so that when the trap is in operation the strainer means serves to remove and retain solid materials carried in a moving fluid stream within the downspout, said door providing ready access to the downspout interior to enable easy removal of any retained solid material.

2. The trap of claim 1 in which the body means is generally rectangular in cross section.

3. The trap of claim 2 in which the strainer means is formed from a portion of the body means wall removed to form the first aperture, the front edge of said strainer means remaining attached to the wall along an essentially right angle fold line at the downstream end of the first aperture.

4. The trap of claim 2 in which the second aperture is of substantially trapezoidal shape and the parallel base lines of the trapezoid lie essentially parallel to the front edge of the strainer means.

5. The trap of claim 4 in which the longer base line of the second aperture lies adjacent to and essentially parallel to the fold line forming the front edge of the strainer means.

6. The trap of claim 4 in which the door has a major upper portion which closes the cleanout port and a minor lower portion entering the body means at the second aperture and extending within the body means so as to close the second aperture and prevent fluid leakage from either aperture when the door is closed.

7. The trap of claim 6 in which the longitudinal edges of the door have opposed notches on the line separating the upper and lower portions, said notches being centered along the longer base of the second aperture and cooperating with the wall of the body means to form the door hinge and to retain said door in the second aperture.

8. The trap of claim 3 in which the rear edge of the strainer means is folded into a tab which is fastened to the body means.

9. The trap of claim 1 in which the clamping bias of the cleanout door is adjusted to retain the door in the normally closed position and yet allow the door to open in response to the hydrostatic head of a column of retained liquid caused by the strainer having become plugged.

10. The trap of claim 1 in which the body means, foraminous strainer means, and cleanout port door are each formed from sections of stock gutter downspout material.

11. The method of making a solids trap for a gutter downspout which comprises:
(a) providing a duct like body means adapted for insertion at a predetermined location in the downspout;
(b) forming a first or cleanout aperture in the wall of the body means;
(c) locating a foraminous strainer having front and rear edges transversely across the duct portion of the body means at the downstream end of the cleanout aperture;
(d) forming a second or hinge aperture in the body means downstream from and adjacent to the strainer;
(e) providing a door for the cleanout port, said door having upper and lower portions, the lower portion entering the body means at the second aperture and extending within the body means to close the second aperture while the upper portion lies outside the body means to cover the cleanout aperture; and
(f) forming the longitudinal edges of said upper portion to wrap around the body means and provide a clamping bias to hold the door in the closed position.

12. The method of claim 11 which further comprises:
(g) cutting a generally rectangular first or cleanout aperture in the body means, said cut comprising interconnecting longitudinal side cuts and a transverse upstream end cut so as to form a tab attached to the body means at a transverse downstream end, the tab being of sufficient length to bridge across the body means duct;
(h) perforating the tab with a multiplicity of small openings; and
(i) bending the tab along the attached edge so that it forms an approximately 90 degree fold line with the front wall of the body means and lies transversely across the duct to function as the foraminous strainer.

13. The method of claim 11 which further comprises:
(j) cutting a second or hinge aperture in the body means adapted to receive the lower portion of said door in a hinged relationship whereby said door pivots at said hinge aperture; and
(k) cutting narrow opposed notches into the longitudinal edges of the cleanout door at the position where it enters the second or hinge aperture, along the line of the top edge of said aperture; and
(l) forming the longitudinal edges of the lower portion of the cleanout door below the opposed notches into retainer tabs, folding said retainer tabs inwardly so as to allow insertion of the door into the second or hinge aperture, inserting said door into said aperture, and then folding said retainer tabs outwardly so that the opposed notches in the door cooperate with the walls of the body means immediately adjacent to the top edge of the second aperture to from a door hinge and to securely retain the door.

14. The method of claim 11 which further comprises adjusting the clamping bias of the wrap-around longitudinal edges of the cleanout door to maintain said door in a normally closed positon openable in response to the hydrostatic head of a column of retained liquid caused by the strainer having become plugged.

15. The method of claim 11 wherein the body means, foraminous stainer and cleanout port door are formed from sections of stock gutter downspout material.

* * * * *